United States Patent [19]
Fukuda et al.

[11] Patent Number: 5,416,656
[45] Date of Patent: May 16, 1995

[54] MAGNETIC RECORDING AND REPRODUCING HEAD HAVING A FLAT SURFACE WITH ROUND FRONT RIDGE

[75] Inventors: Kazumasa Fukuda; Monjiro Momoi; Takamitsu Tsuna; Mikio Matsuzaki, all of Tokyo, Japan

[73] Assignee: TDK Corporation, Tokyo, Japan

[21] Appl. No.: 801,626

[22] Filed: Dec. 4, 1991

Related U.S. Application Data

[63] Continuation of Ser. No. 429,457, Oct. 31, 1989, abandoned.

Foreign Application Priority Data

Nov. 8, 1988 [JP] Japan .................. 63-282004

[51] Int. Cl.⁶ .................. G11B 5/60; G11B 5/012
[52] U.S. Cl. .................. 360/103; 360/104; 360/97.01
[58] Field of Search .............. 360/125, 122, 129, 102, 360/103, 104, 97.01, 97.04, 99.08, 110, 73.03

[56] References Cited

U.S. PATENT DOCUMENTS

| | | | |
|---|---|---|---|
| 4,803,577 | 2/1988 | Ezaki et al. | 360/102 |
| 4,908,727 | 3/1990 | Ezaki et al. | 360/135 |
| 4,918,556 | 4/1990 | Ezaki et al. | 360/103 X |
| 4,928,195 | 5/1990 | Ezaki et al. | 360/103 |
| 4,939,604 | 7/1990 | Fukuda et al. | 360/103 |

FOREIGN PATENT DOCUMENTS

| | | | |
|---|---|---|---|
| 0126521 | 1/1979 | Japan | 360/122 |
| 0210511 | 9/1986 | Japan | 360/122 |
| 0121116 | 5/1988 | Japan | 360/122 |
| 0084486 | 3/1989 | Japan | 360/110 |

*Primary Examiner*—Andrew L. Sniezek
*Attorney, Agent, or Firm*—Oblon, Spivak, McClelland, Maier, & Neustadt

[57] ABSTRACT

A magnetic recording and reproducing apparatus having a magnetic disk, a magnetic head and a magnetic head supporting device. The surface roughness $R_{max}$ of the magnetic disk is at most 10 nm, and the magnetic head has a slider on which reading and writing elements are mounted. The slider is of a generally rectangular prism shape with the entire area of a medium opposing surface which opposes the magnetic disk being flat. The surface area of the medium opposing surface is 2 mm² or less. The apparatus has a first relative speed at which the frictional coefficient between the magnetic disk and the magnetic head is changed from a high value to a low value when the speed increases, and a second relative speed at which the frictional coefficient is changed from a low value to a high value when the speed decreases. A ridge portion between the front surface and the medium opposing surface has a round corner, wherein the length of the round corner in the direction of the medium opposing surface is larger than the length of the round corner in the direction of the front surface.

4 Claims, 8 Drawing Sheets

MAGNETIC RECORDING AND REPRODUCING HEAD HAVING A FLAT SURFACE WITH ROUND FRONT RIDGE

This application is a continuation of application Ser. No. 07/429,457, filed on Oct. 31, 1989, now abandoned.

BACKGROUND OF THE INVENTION

Field of the Invention

The present invention relates to a magnetic recording and reproducing apparatus and a magnetic head used for the apparatus. More, particularly, it relates to a magnetic recording and reproducing apparatus capable of recording data with a high density and a magnetic head having a slider capable of flying with a flying height, which is used for the magnetic recording and reproducing apparatus.

Discussion of Background

It has been known heretofore that a magnetic recording and reproducing apparatus with a flying type magnetic head capable of flying with a microscopic gap from a magnetic recording medium by a minute air bearing which is formed due to the dynamic pressure caused when the magnetic recording medium is moved. Some conventional flying type magnetic heads are disclosed in, for example, Japanese Examined Patent Publication Nos. 21329/1983, 28650/1983 and so forth. The basic construction described therein is such that reading/writing elements are attached to the air discharge end of a slider having a flying plane on its one side opposed to a magnetic recording medium.

Figure 15:
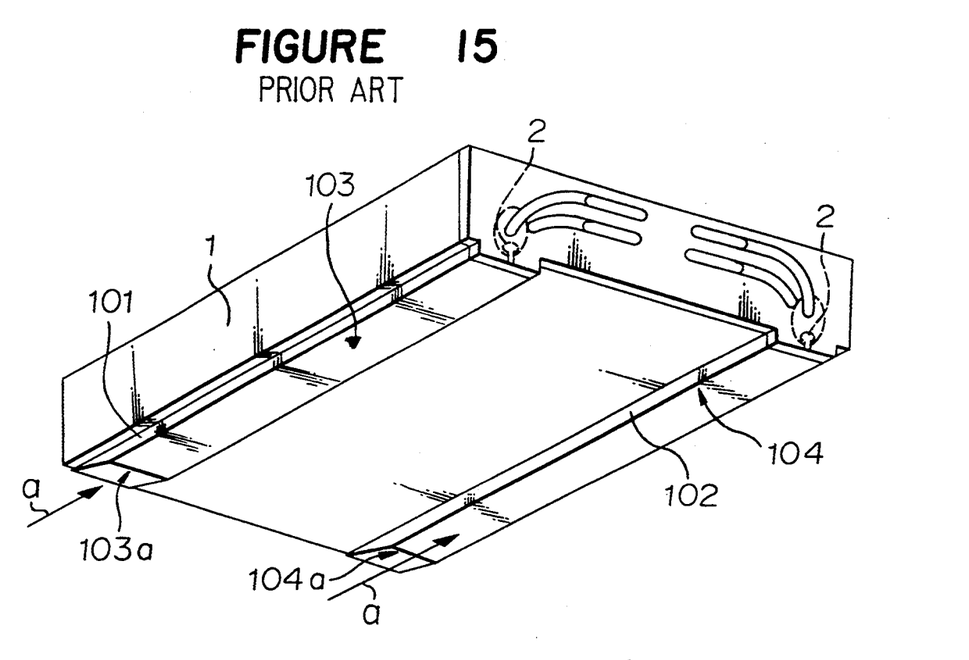
FIG. 15 is a perspective view of a conventional magnetic head.

FIG. 15 is a perspective view of such exemplary conventional magnetic head, wherein there are shown a slider 1 composed of a ceramic material or the like, and reading/writing elements 2. The slider 1 has, on its one surface opposed to a magnetic recording medium, two rails 101, 102 which are spaced apart from each other and have flying planes 103, 104 defined with a high flatness. On the flying planes 103, 104, tapered portions 103a, 104a are formed at the inflow ends thereof relative to an air stream flowing in the direction indicated by an arrow mark a in combination with the magnetic recording medium. The reading/writing elements 2 are thin-layer elements produced by the same process as in the IC manufacture technology and attached to the air discharge end on the reverse side with respect to the tapered portions 103a, 104a.

Figure 16:
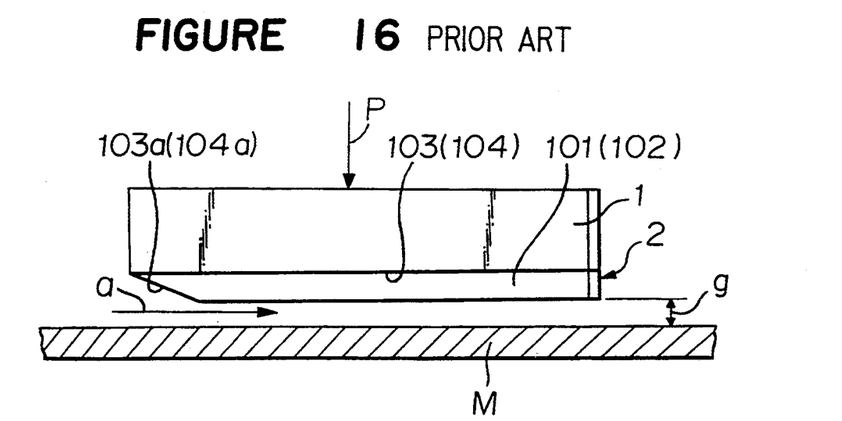
FIG. 16 is a diagram showing the construction of the conventional magnetic recording and reproducing apparatus in form of model.

In the use for a magnetic recording and reproducing apparatus, the magnetic head is secured to the fore end of an unshown gimbal support device, and the flying planes 103, 104 of the slider 1 are brought into elastic contact with the surface of the magnetic disk. And the magnetic head held in such a state is driven in the so-called contact start-stop mode. When the magnetic disk is kept still, the flying planes 103, 104 of the slider 1 are pressed elastically against the dick surface. But upon start of rotation of the magnetic disk, as illustrated in FIG. 16, a lifting dynamic pressure is exerted on the flying planes 103, 104 of the slider 1 including the tapered portions 103a, 104a, so that the magnetic head is caused to fly by a flying height q based on the balance between such dynamic pressure and the resilient pressure P of the gimbal spring.

In this case, operations were carried out at a region where the flying height g was about 0.3 μm.

In the conventional magnetic recording and reproducing apparatus of this kind, the flying height g of the magnetic head should be small as possible to realize high density recording. However, there has been a problem that the withstanding properties of the magnetic disk and the magnetic head are greatly decreased when the flying height is to be reduced.

Figure 14:
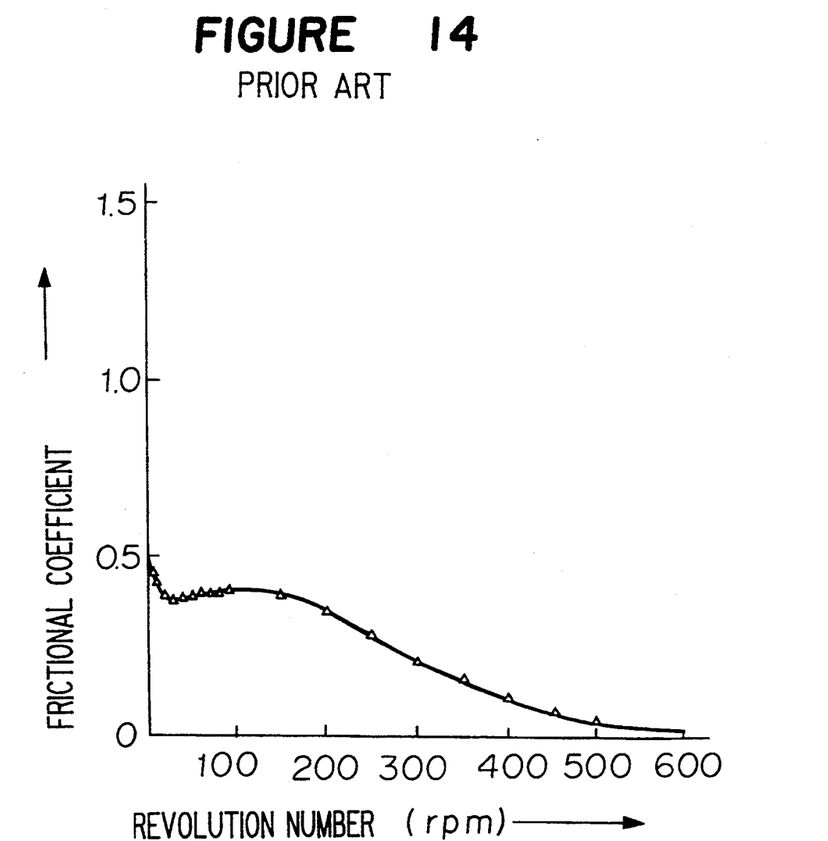
FIG. 14 is a diagram showing data in a relation of the revolution number to the frictional coefficient in a conventional recording and reproducing apparatus.

FIG. 14 is a diagram showing data in relation of revolution number to frictional coefficient in a conventional magnetic recording and reproducing apparatus. A magnetic head used for obtaining the data is of a type having rails as shown in FIGS. 15 and 16 in which the length in the direction of an air stream of the head is 3.2 mm and the width is 2.6 mm. A load of 7.0 g is exerted to the magnetic disk by means of a head supporting device. A lubricant having a concentration of 0.1% is applied to the surface of the magnetic disk.

As is apparent from the data, the frictional coefficient gradually decreases as the revolution number is increased. On the contrary, the frictional coefficient gradually increases as the revolution number is decreased. Accordingly, when the apparatus is driven by the contact start-stop mode, an unnegligible large resistance of friction occurs for a fairly long time between the magnetic disk and the magnetic head at the time of starting or stopping, whereby there easily takes place a damage by crushing and so on, and the durability is decreased.

On the other hand, when the surface properties of the magnetic disk are increased to thereby improve the durability, the magnetic head is apt to be strongly stuck to the surface of the magnetic disk due to influence of moisture or water component in air; so that it becomes impossible to start. Therefore in the conventional magnetic recording and reproducing apparatus, there was a limit in an attempt to further reduce the flying height.

SUMMARY OF THE INVENTION

It is an object of the present invention to provide a magnetic recording and reproducing apparatus capable of recording data with a high density which is operable with an extremely low flying height and having a high degree of durability while magnetic recording and reproducing operations can be conducted without causing the sticking of the magnetic head to the surface of the magnetic disk, and a magnetic head used for such apparatus.

In accordance with the present invention, there is provided a magnetic recording and reproducing apparatus including a magnetic disk, a magnetic head and a magnetic head supporting device wherein magnetic recording and reproducing are effected by causing a relative rotation between the magnetic disk and the magnetic head, characterized in that the surface roughness $R_{max}$ of the magnetic disk is at most 10 nm, and the magnetic head having a slider on which reading and writing elements are mounted is of a generally rectangular prism shape wherein the entire area of a medium opposing surface which opposes the magnetic disk is made flat, and the surface area of the medium opposing surface is 2 mm² or less, wherein the apparatus has a first relative speed at which the frictional coefficient between the magnetic disk and the magnetic head is changed from a high value to a low value in a case that the relative speed is changed toward the increasing side, and a second relative speed at which the frictional coefficient is changed from a low value to a high value in a case that the relative speed is changed toward the decreasing side.

In accordance with the present invention, there is provided a magnetic head having a slider on which reading and writing elements are mounted, characterized in that the outer configuration of the magnetic head is in a generally rectangular prism, the entire area of a medium opposing surface which opposes a magnetic disk is made flat, and the surface area of the medium opposing surface is 2 mm$^2$ or less, and at least a ridge portion formed by a side surface to which an air stream directs and the medium opposing surface has a round corner, wherein the length of the round portion in the medium opposing surface is larger than the length of the round portion in the side surface.

BRIEF DESCRIPTION OF DRAWINGS

A more complete appreciation of the invention and many of the attendant advantages thereof will be readily obtained as the same becomes better understood reference to the following detailed description when considered in connection with the accompanying drawings, wherein.

DETAILED DESCRIPTION OF PREFERRED EMBODIMENTS

Figure 1:
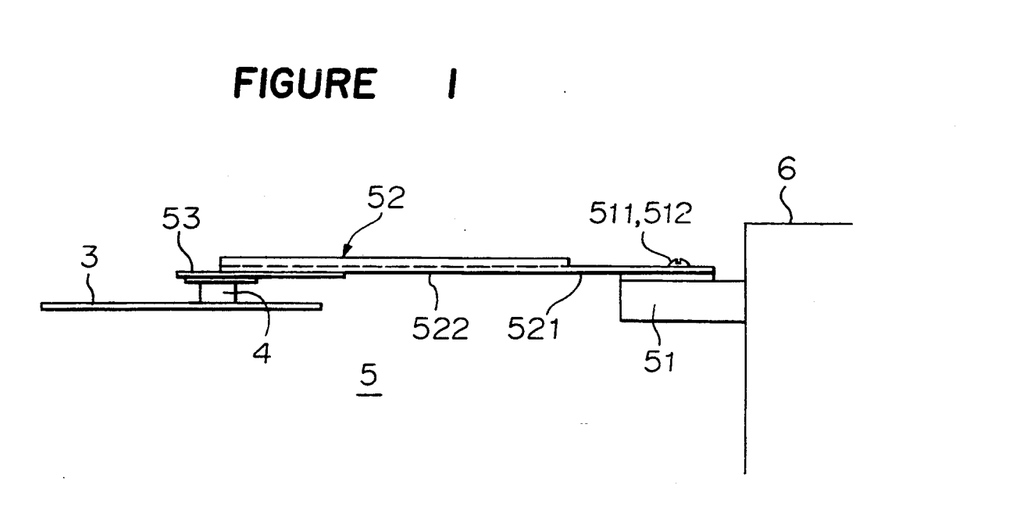
FIG. 1 is a front view of an embodiment of the magnetic recording and reproducing apparatus according to the present invention.
Figure 2:
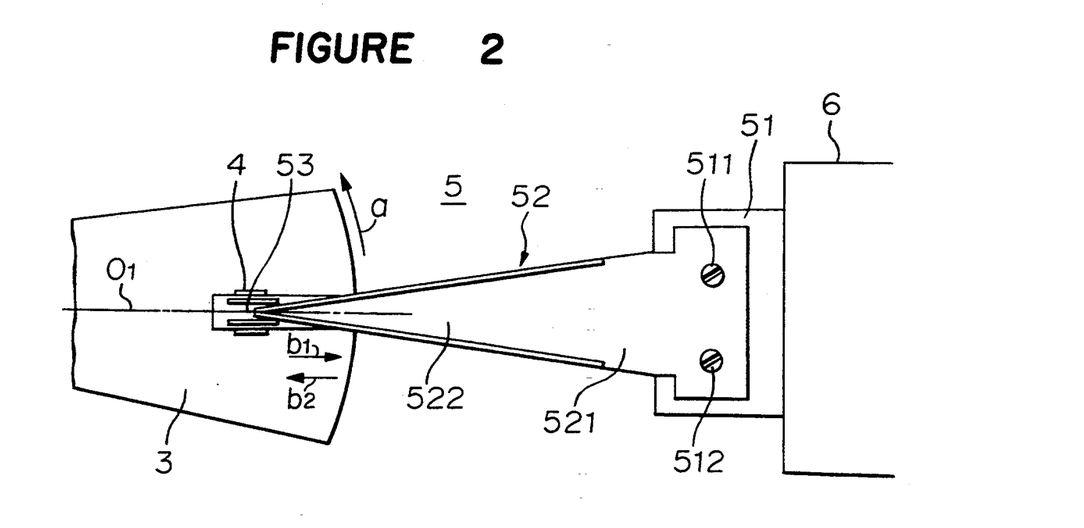
FIG. 2 is a plane view of the same.

Hereinbelow, exemplary embodiments of the present invention will be described in detail with reference to the accompanying drawings. FIG. 1 is a front view of an important part of an embodiment of the magnetic recording and reproducing apparatus according to the present invention and FIG. 2 is a plane view of the same. In the drawings, reference numeral 3 indicates a magnetic disk, numeral 4 indicates a magnetic head, numeral 5 indicates a gimbal type magnetic head supporting device (hereinbelow referred to simply as a gimbal supporting device), and numeral 6 indicates a positioning device. The magnetic disk 3 is rotationally driven in the direction of an arrow a by a rotational drive mechanism (not shown). The magnetic head 4 is supported by the gimbal supporting device 5 so as to bear a load and to be permitted to effect a pitching motion and a rolling motion.

The supporting device 5 comprises a supporter 52 made of a resilient thin metal plate, one end of which is secured by fastening means 511 and 512 to a rigid arm 51, which is attached to the positioning device 6. At the free end in the longitudinal direction of the supporter 52, a flexible member 53 is attached. On the lower surface of this flexible member 53, a magnetic head 4 is attached. The supporter 52 has a resilient spring portion 521 which is attached to the rigid arm 51. A rigid beam portion 522 is formed continuously from this resilient spring portion 521. The supporting device 5 is driven by the positioning device 6 in the direction of an arrow $b_1$ or $b_2$ along the rotational diameter $O_1$ for positioning, whereby the magnetic recording or reproduction is conducted at a predetermined track, between the magnetic disk 3 and the magnetic head 4.

Figure 3:
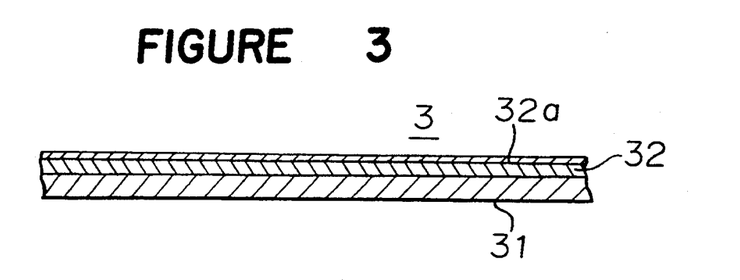
FIG. 3 is an enlarged cross-sectional view partly broken of a magnetic disk which constitutes a structural element of the magnetic recording and reproducing apparatus of the present invention.

The magnetic disk 3 is a medium having good surface properties with a surface roughness $R_{max}$ of at most 10 nm, preferably at most 5 nm. As shown in FIG. 3, the magnetic disk 3 comprises a rigid substrate 31 and a magnetic recording layer 32 formed on the surface of the substrate by a vacuum depositing method. The magnetic recording layer 32 is formed as a thin magnetic layer of e.g. $\gamma$—Fe$_2$O$_3$ or Co—Ni or Co—Cr. The thickness of the magnetic recording layer 32 formed by the vacuum depositing method is at most about 0.5 μm, and therefore the surface properties of the rigid substrate 31 is reflected as the surface properties in the recording layer 32. Accordingly, as the rigid substrate 31, the one having a surface roughness $R_{max}$ of at most 10 nm is employed. As specific examples of such a rigid substrate, rigid substrates composed essentially of glass, chemically reinforced soda alumino silicate glass or ceramics are suitable. When the surface roughness $R_{max}$ is at most 10 nm, especially at most 5 nm, collision of the magnetic head to the magnetic disk can be avoided even when they are actuated under a nearly contacting state. Accordingly, the durability can be improved.

Figure 4:
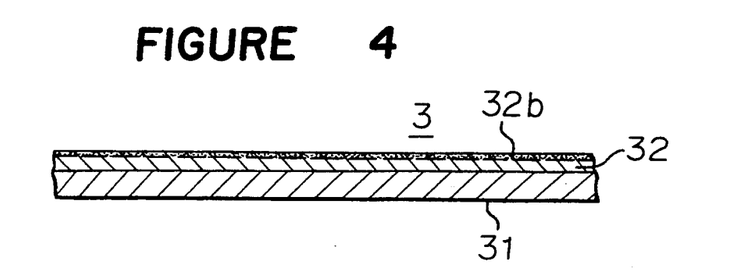
FIG. 4 is an enlarged cross-sectional view partly broken of another embodiment of the magnetic disk of the present invention.

The magnetic recording layer 32 may be constituted by a magnetic iron oxide such as $\gamma$—Fe$_2$O$_3$ or a magnetic nitride. Further, when the magnetic layer is made of a metal or alloy, it is advisable to form an oxide layer or a nitride layer 32a on its surface as shown in FIG. 3, or it is advisable to convert the surface into an oxidized coating film 32b as shown in FIG. 4. Thus, the durability of the magnetic recording layer 32 can be improved, and it is possible to prevent a damage to the magnetic disk 3. The oxide layer or the nitride layer 32a can be formed by reactive sputtering or by reactive vapor deposition. The oxidized coating film 32b may be formed by intentionally oxidizing the surface of the magnetic recording layer 32 made of a metal or alloy containing at least one member of iron, cobalt and nickel, such as Co—Ni or Co—Cr, by e.g. reactive plasma treatment. The magnetic disk 3 may be of a vertical recording type wherein the recording residual magnetization is composed essentially of a component perpendicular to the recording layer or of an in-plane recording type wherein the recording residual magnetization is composed essentially of a component in the same plane as the recording layer. A lubricant may be coated on the surface of the magnetic recording layer 32 although such an embodiment is not shown in the drawings.

The magnetic head 4 is so constructed that reading and writing elements are held by the slider, the shape of the magnetic head is as a whole in a generally rectangular prism; the entire surface of a medium opposing surface 411 which opposes the magnetic disk is made flat and the surface area of the medium opposing surface is 2 mm² or less.

Figure 5:
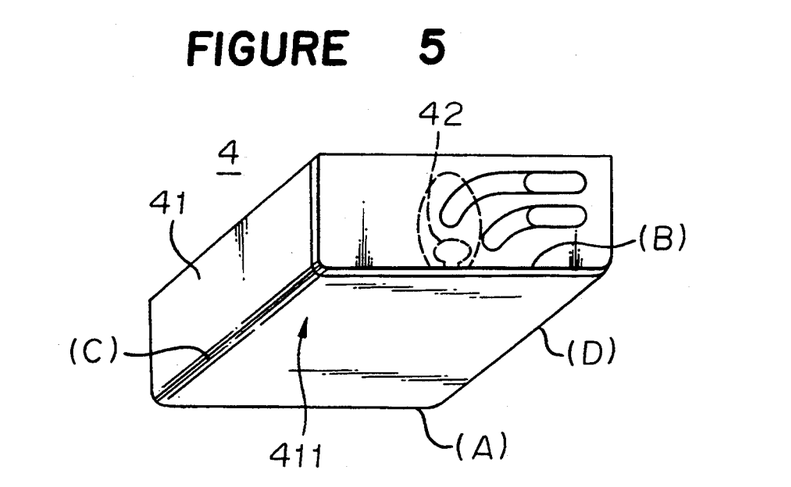
FIG. 5 is a perspective view of an embodiment of the magnetic head of the present invention.
Figure 6:
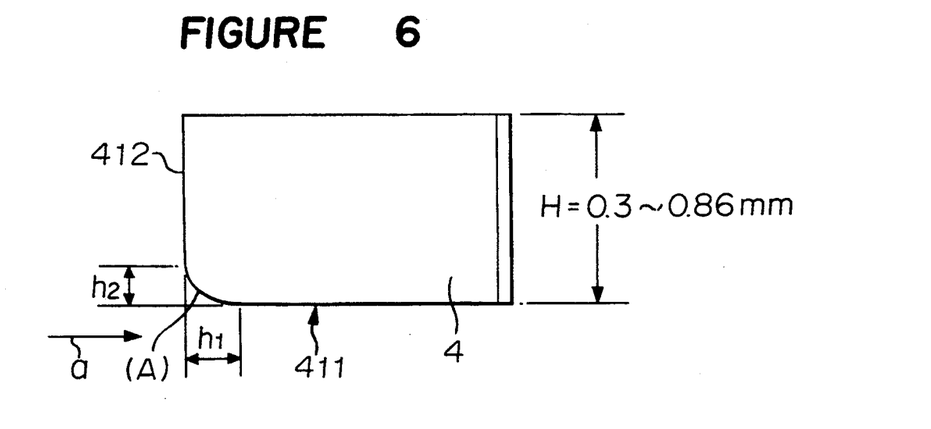
FIG. 6 is a side view of the same.

FIG. 5 is a perspective view of an embodiment of the magnetic head of the present invention and FIG. 6 is a side view of the same, wherein reference numeral 41 designates a slider and numeral 42 designates a reading/writing element. The medium opposing surface 411 of the slider 41 is formed to have no rail portion and tapered portion, and the surface area of the medium opposing surface 411 is determined to be 2 mm² or less.

The width W and the length L of the magnetic head 4 are so determined as to satisfy the specified value. It is desirable that the surface roughness $R_{max}$ of the medium opposing surface 411 is determined to be 20 nm or less.

As illustrated in FIG. 6, the magnetic head 4 is so formed that the ridge portion A formed by the front surface 412 which faces the air-flowing direction a and the medium opposing surface 411 has a round portion. In the round ridge portion A, the length h1 of the round portion in the medium opposing surface 411 in view of the air-flowing direction a is longer than the length h2 of the round portion in the direction of height of the front surface 412, namely, h1>h2. It has been found that the round ridge portion A further enhances the function of the present invention. The round ridge portion may be formed other portion than the ridge portions A.

Further, it is preferable that the height H of the magnetic head measured from the medium opposing surface 411 as a reference is determined to be in a range of 0.3 mm-0.85 mm. To provide such value of height H influences a revolution speed which rapidly changes the frictional coefficient, as described later.

Figure 7:
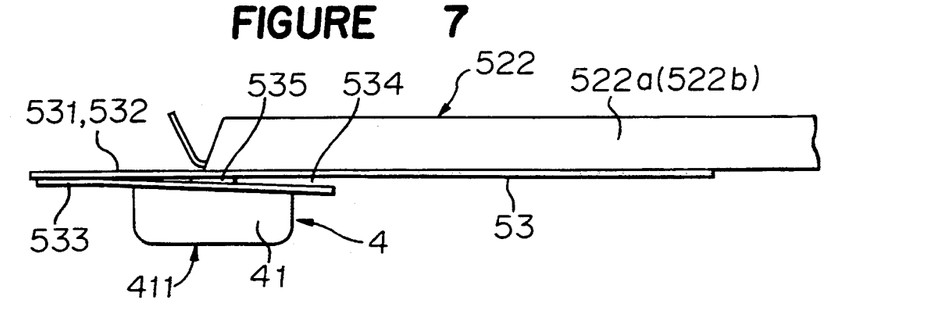
FIG. 7 is a front view showing an assembly of a magnetic head and a supporting device used for the present invention.
Figure 8:
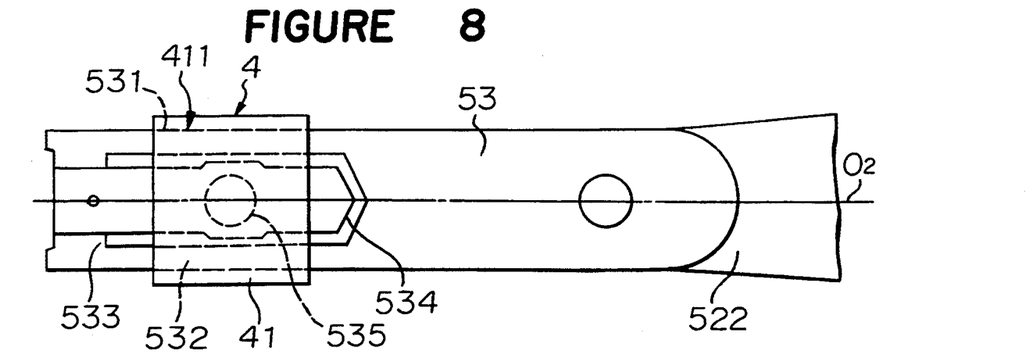
FIG. 8 is a plane view of the assembly as shown in FIG. 7.

FIGS. 7 and 8 are diagrams showing an assembled structure of the magnetic head 4 and the supporting device 5 as shown in FIG. 5 wherein the magnetic head 4 is attached to the lower surface of the flexible member 53 which is attached to the free end of the supporter 52. The rigid beam portion 522 of the supporter 52 has flanges 522a and 522b formed by bending the beam portion along both sides.

The flexible member 53 comprises two flexible outer frame portions 531 and 532 extending substantially in parallel with the axial line in the longitudinal direction of the supporter 52, a lateral frame 533 connecting the flexible outer frame portions 531 and 532 at the end far from the supporter 52 and a central tongue portion 534 extending substantially in parallel with the flexible outer frame portions 531 and 532 from about the center of the lateral frame 533 and having its forward end as a free end. One end opposite to the end having the lateral frame 533 is connected to near the free end of the supporter 52 by means of e.g. welding.

A loading projection 535 in a semi-spherical form is provided on the upper surface of the central tongue portion 534 of the flexible member 53 so that a loading force is transmitted from the free end of the supporter to the central tongue portion 534. The surface of the magnetic head 4 is bonded to the lower surface of the central tongue portion 534 by means of, for instance, an adhesive.

Figure 9:
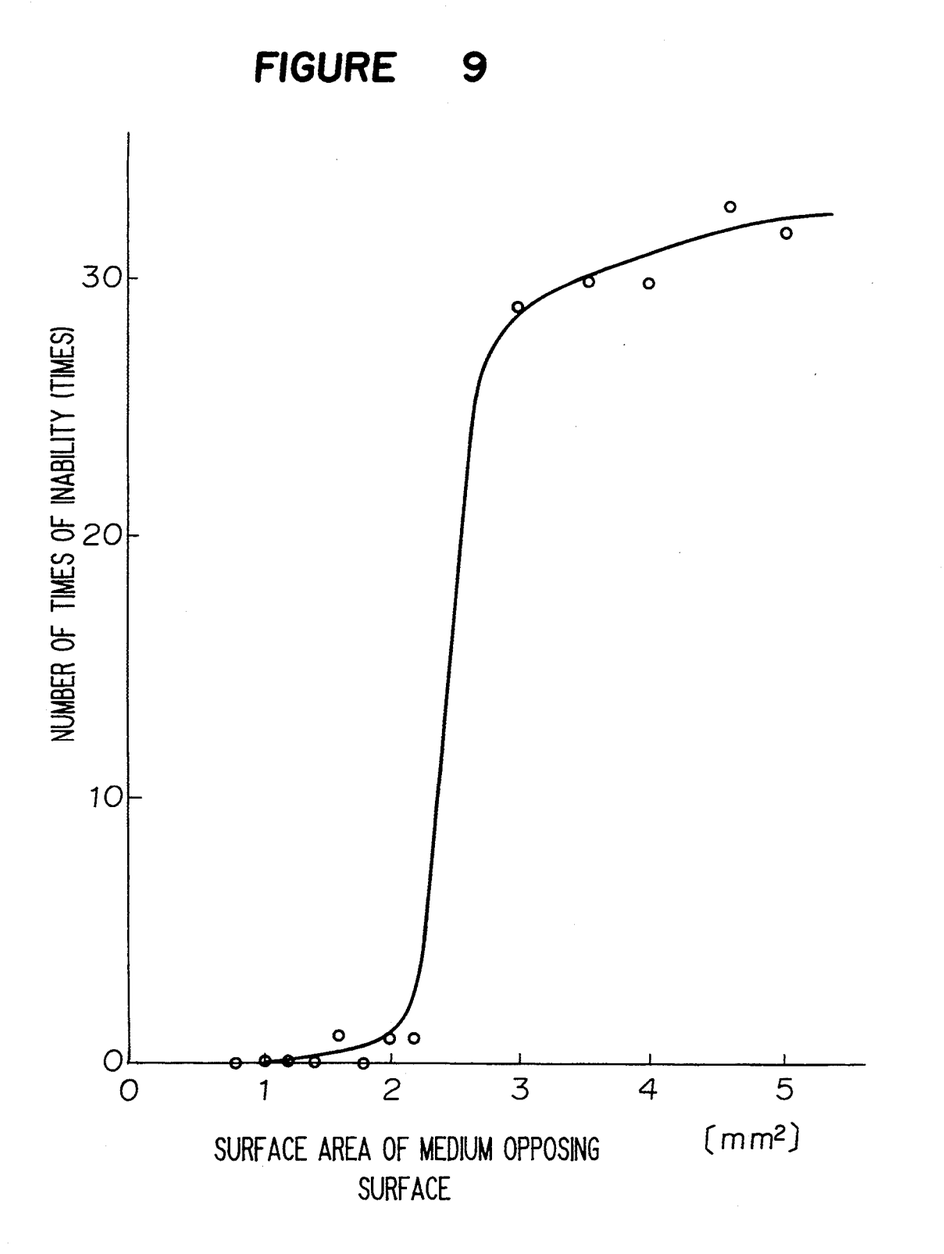
FIG. 9 is a diagram showing a relation of the surface area of the medium opposing surface of the magnetic head to the number of times of inability of starting.
Figure 10:
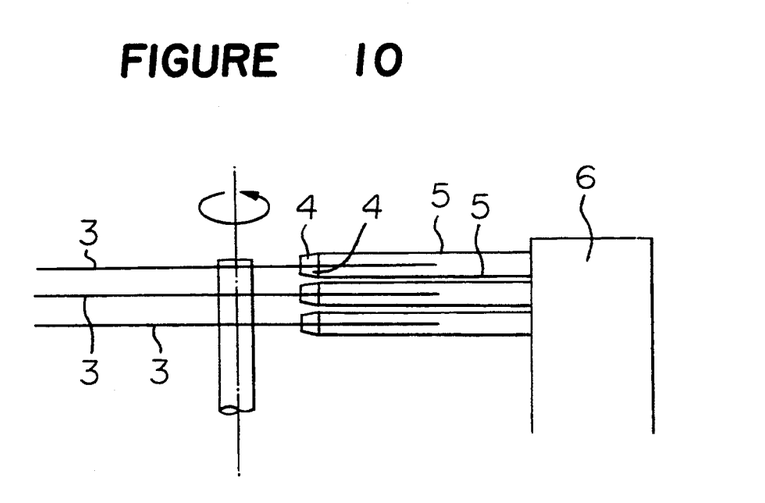
FIG. 10 is a diagram showing the structure of a magnetic recording and reproducing apparatus used for obtaining the data as shown in FIG. 9.

FIG. 9 is a diagram showing a relation of the surface area of the medium opposing surface of the magnetic head to the number of times of inability of starting of the head. FIG. 10 is a diagram showing the construction of the magnetic recording and reproducing apparatus used for obtaining the data of FIG. 9. In FIG. 10, three 5.25 inch magnetic disks 3 are arranged and magnetic heads are supported by supporting devices 5 so that the magnetic heads 4 are arranged to face both surfaces of each of the magnetic disks 3. Conditions of measurement are as follows.

A method of test: a contact start-stop mode
The number of starting: 200,000/sample
Surface roughness $R_{max}$ of magnetic disks:
$R_{max}<10$ nm
Torque T of starting of a spindle motor:
T=200 gf.cm As is clear from the data in FIG. 9, there is a point of inflection near a surface area of 2 mm² of the medium opposing surface 411 of the magnetic head 4, and the number of times of inability of starting is extremely low in the area lower than 2 mm². Especially, there is low inability of starting at the area less than 1.5 mm² in starting tests of 200,000 times. On the other hand, the number of times of inability of starting jumps to more than 30 times when the surface area exceeds 2 mm².

Figure 11:
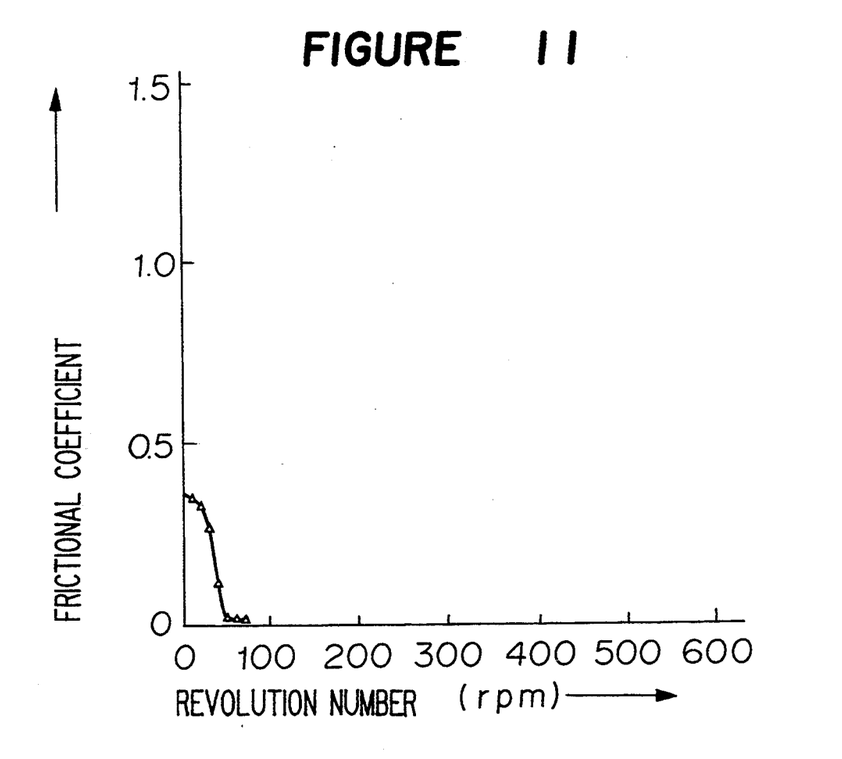
FIG. 11 is a diagram showing a relation of revolution number to frictional coefficient of the magnetic recording and reproducing apparatus according to the present invention.

FIG. 11 is a diagram showing data in a relation of the revolution number to the frictional coefficient in the magnetic recording and reproducing apparatus according to the present invention. The dimensions of the magnetic head 4 are as follows.

The length L=1.1 mm
The width W=1.2 mm
The surface area of the medium opposing surface=1.32 mm²
The height H=0.85 mm A load of 8.4 g is applied to the magnetic disk by means of the supporting device, and a lubricant having a concentration of 0.1% is applied to the surface of the magnetic disk.

As shown in FIG. 11, the magnetic recording and reproducing apparatus of the present invention shows sudden decrease of frictional coefficient in a extremely low revolution number region of less than 300 rpm. Namely, the magnetic head falls in a steady operating state in an extremely short time after the starting of the motor, and it floats or stops in a small revolution speed range which is closely related to friction, whereby the friction of contact between the magnetic disk and the magnetic head becomes small in terms of time and quantity. It is therefore estimated that the minimization of the friction of contact greatly improves the durability.

Figure 12:
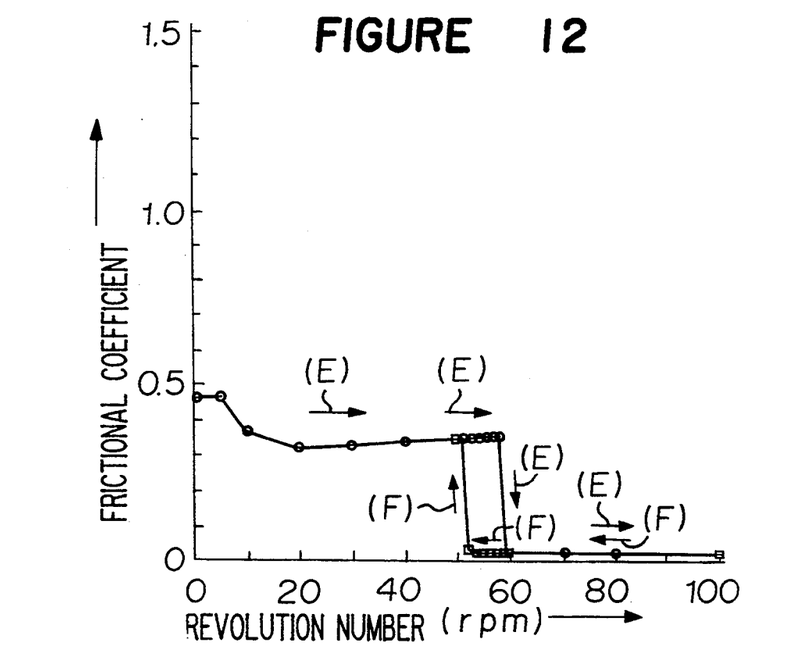
FIG. 12 is a diagram showing the data of a specified portion of FIG. 11 in which the frictional coefficient becomes substantially 0 at a range of the revolution number.

FIG. 12 is an enlarged diagram of FIG. 11, which shows that the frictional coefficient is rapidly changed at a certain range of the revolution number. In FIG. 12, arrow marks E indicate the characteristic of the change of frictional coefficient at the time of starting in which the revolution number increases in the contact start-stop mode, and arrow marks F indicate the characteristic of the change of frictional coefficient at the time of stopping in which the revolution number decreases. At the starting, the frictional coefficient suddenly decreases to a nearly zero value at an area of revolution number of 60 rpm or less. Accordingly, a damage of, for instance, crushing is seldom occurred at the time of starting, and the durability is improved.

At the stopping time in which the revolution number goes to decreasing, the frictional coefficient is nearly 0 till a revolution number of 50 rpm, and it suddenly increases at around 50 rpm. The revolution number at this moment is around 50 rpm which is further lower than the revolution number (about 60 rpm) which causes sudden reduction in frictional coefficient at the time starting. Accordingly, it is further difficult for the damage such as crushing to occur at the time of stopping in comparison with the starting time, and the durability is improved.

In either case of increase or decrease in revolution number, the absolute value of the change of the frictional coefficient $\Delta\mu$ to the change of revolution number ($\Delta$ rpm) between 50 rpm and 60 rpm=10 rpm, is more than 0.3, and the ratio ($\Delta\mu/\Delta$ rpm) is more than 0.03, which shows a sudden change.

Figure 13:
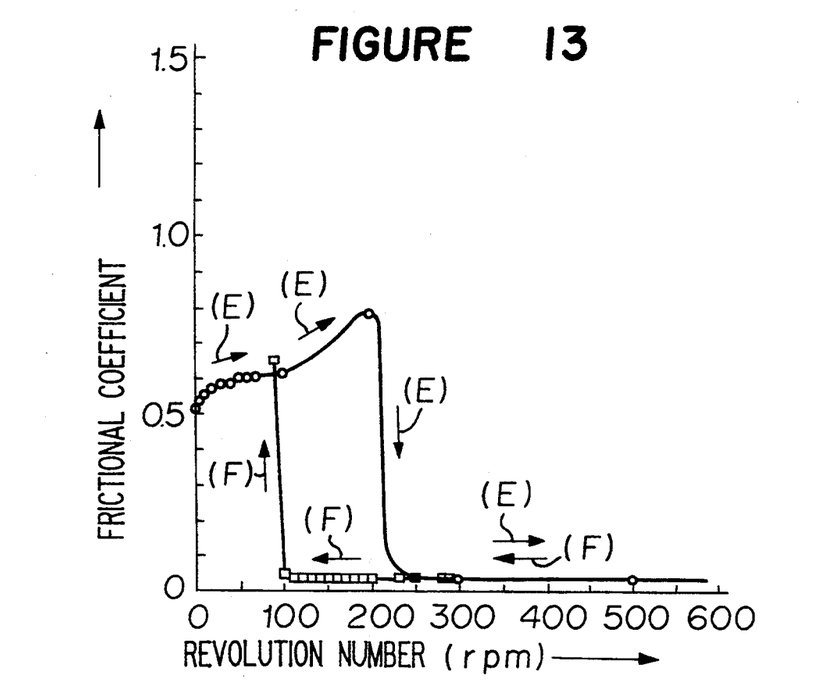
FIG. 13 is a diagram showing data in a relation of the revolution number to the frictional coefficient when the height H of the magnetic head is 0.55 mm.

FIG. 13 is a diagram showing data in a relation of the frictional coefficient to the revolution number in which the height H of the magnetic head is determined to be 0.55 mm. As shown in the data, when the height of the magnetic head is made small, the revolution number which causes a rapid change in the frictional coefficient is moved toward a higher value. Practically it is desirable that the height H is determined to be about 0.3 mm–0.85 mm.

In accordance with the present invention, the following advantages can be obtained.

(A) The magnetic disk has a surface roughness $R_{max}$ of at most 10 nm. Accordingly, even when the magnetic head is operated at an extremely low flying height which can be considered a nearly contacting state, collision between the magnetic disk and the magnetic head seldom occurs. Therefore, the durability of the magnetic recording and reproducing apparatus can be increased.

(B) The magnetic head is generally of a rectangular prism form and has a medium opposing surface which is made flat wherein the surface area of the medium opposing surface is 2 mm² or less. Accordingly, when the magnetic head is used in association with the magnetic disk, the magnetic recording and reproducing apparatus suppresses a possibility of sticking of the magnetic head to the magnetic disk.

(C) In a combination of the magnetic disk and the magnetic head and when a relative speed between the magnetic disk and the magnetic head is changed toward the side of increasing, the magnetic recording and reproducing apparatus has a first relative speed at which the frictional coefficient between the magnetic disk and the magnetic head is changed from a high value to a low value. Accordingly, a problem of crushing is minimized when the apparatus is started in the contact start-stop mode. Therefore, the magnetic recording and reproducing apparatus having high durability can be produced.

(D) The apparatus has a second relative speed at which the frictional coefficient is changed from a low value to a high value in a case that the relative speed is changed toward the decreasing side. Accordingly, a problem of crushing can be minimized at the stopping time, and therefore, the magnetic recording and reproducing apparatus having high durability can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic recording and reproducing apparatus including a magnetic disk, a magnetic head and a magnetic head supporting device wherein magnetic recording and reproducing are effected by causing a relative rotation between said magnetic disk and said magnetic head, characterized in that:

a surface roughness $R_{max}$ of said magnetic disk is at most 10 nm, and said magnetic head having a slider on which at least one reading/writing element is mounted which is of a generally rectangular prism shape wherein a medium opposing surface which opposes said magnetic disk, includes a main portion which is flat and which constitutes most of the area of said medium opposing surface and an edge portion, and the surface area of the medium opposing surface is 2 mm² or less, wherein the apparatus has a first relative speed at which a frictional coefficient between said magnetic disk and said magnetic head is changed from a high value to a low value when said first relative speed is increased, and a second relative speed at which said frictional coefficient is changed from a low value to a high value when said second relative speed is decreased;

said reading/writing element being mounted on a rear end surface of said rectangular prism shape, a front end surface of said rectangular prism shape being opposite said read end surface and facing toward a direction from which an air stream, caused by relative motion between said magnetic disk and said slider, is generated, said edge portion (A) being between said front end surface and said medium opposing surface and being rounded, said edge portion (A) having a first length in a direction parallel to said medium opposing surface which is longer than a second length in a direction parallel to said front end surface.

2. The magnetic recording and reproducing apparatus according to claim 1, wherein the absolute value of the ratio ($\Delta\mu/\Delta$ rpm) of a change ($\Delta\mu$) of said frictional coefficient to a change ($\Delta$ rpm) of revolution when said first relative speed is increased and when said second relative speed is decreased is more than .03.

3. The magnetic recording and reproducing apparatus according to claim 1, wherein said first relative speed is higher than said second relative speed.

4. A magnetic head having a slider on which at least one reading/writing element is mounted, characterized in that:

a medium opposing surface which opposes a magnetic disk, includes a main portion which is flat in two dimensions and which constitutes most of the area of said medium opposing surface and an edge portion, the surface area of the medium opposing surface is 2 mm² or less, and the slider has a generally rectangular prism shape;

said reading/writing element being mounted on a rear end surface of said rectangular prism shape, a front end surface of said rectangular prism shape being opposite said rear end surface and facing toward a direction from which an air stream, caused by relative motion between said magnetic disk and said slider, is generated, said edge portion (A) being between said front end surface and said medium opposing surface and being rounded, said edge portion (A) having a first length in a direction parallel to said medium opposing surface which is longer than a second length in a direction parallel to said front end surface.

* * * * *